3,136,458
CONTAINER INCLUDING A NECK WITH A POURING OPENING AND CLOSING DEVICE FOR THE SAME
Karl Ruetz, Bergstrasse 132, Zurich, Switzerland
Filed Feb. 15, 1962, Ser. No. 173,395
Claims priority, application Switzerland Feb. 27, 1961
3 Claims. (Cl. 222—498)

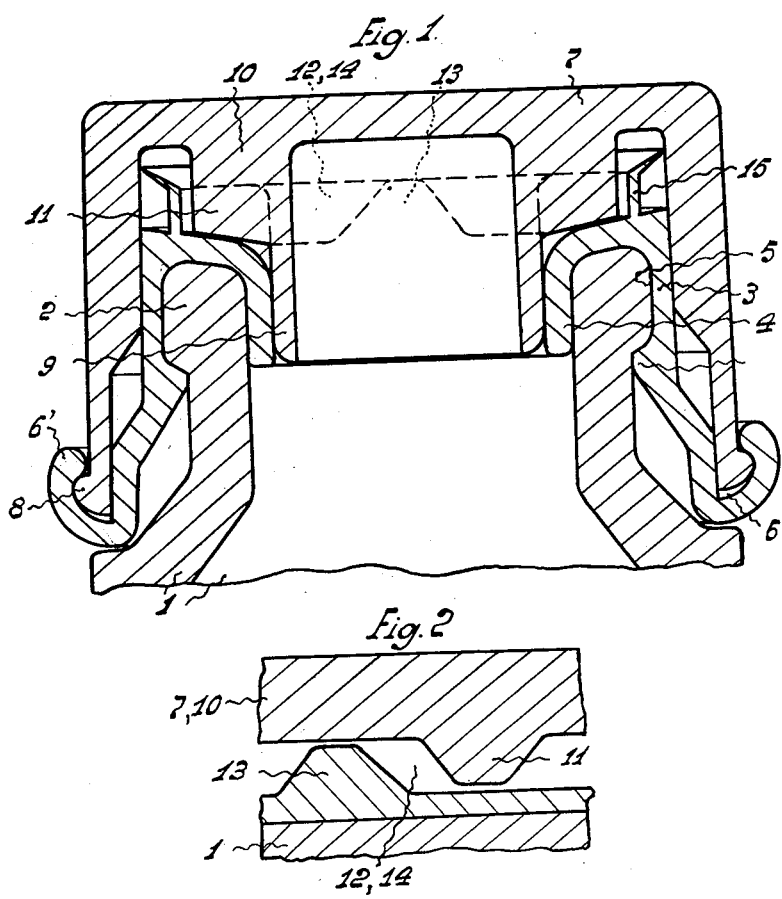

The present invention relates to a container including a neck with a pouring opening, and a closing device for the same including a bushing pushed onto the neck of the container and a closing cap pushed onto the bushing.

According to the invention, the bushing, which consists of an elastically extensible material, has an inner wall part lying within the pouring opening of the container neck and an outer wall part surrounding the outside of the latter, and the neck has an annular bead bulging radially outwardly and fitting tightly into a recess in the outer wall part of the bushing, whilst the lower edge of this wall part is surrounded by an upwardly open groove in which an annular bead provided at the lower edge of the closing cap is detachably held by an inwardly projecting upper edge of the wall of the groove.

In the accompanying drawing one particular embodiment of the invention is represented.

FIG. 1 shows an axial cross-section of the neck of a container with a closing device placed on it, and FIG. 2 the development of a detail of the closing device.

According to the drawing, the neck 1 of a container, the greater part of which is not shown, has an annular bead 2 bulging radially outwardly. A bushing of elastically extensible material, for example soft plastics, which comprises an inner wall part 4 lying within the pouring opening of the neck 1 and an outer wall part 3 covering the outside of the neck is pushed onto the neck. Both wall parts lie tightly on the neck 1, the wall part 3 having a recessed portion 5 in which the annular bead 2 is engaged.

The lower edge of the wall part 3 of the bushing is surrounded by an upwardly open groove 6 having an inwardly directed free end 6'.

Onto the bushing or its wall part 3 covering the outside of the neck, a closing cap 7 is pushed, the lower edge of which is provided with an annular bead 8 which can be inserted into the groove 6 and detachably held therein by the free end 6'.

On its underside the closing cap 7 carries a cylindrical extension 9 which lies tightly on the wall portion 4 of the bushing. The extension 9 has a shoulder 10 projecting radially over the upper side of the bushing.

The shoulder 10 carries radially extending projections 11 arranged at opposite ends of a diameter, the side flanks of which are inclined to the peripheral direction and which are separated by recesses 12 between them.

As shown at 13 the upper side of the bushing also carries radially extending projections, also arranged opposite to each other on a diameter and also provided with flanks that are inclined to the circumferential direction and between which there are recesses 14.

The height of the projections 11 and 13 is chosen in such a way that, when the closing cap 7 is rotated relative to the bushing, the projections 11 or 13, which in the closed position lie in the recesses 14 and 12 respectively, slide on each other and are moved so far in the axial direction that the bead 8 is drawn out of the groove 6. The cap 7 can then be withdrawn from the bushing.

The portion of the inner wall of the closing cap 7 that lies sealingly on the outer wall part 3 of the bushing, presses this wall part with its recess 5 onto the bead 2 and keeps the bushing firmly held on the neck 1.

At its upper side, the bushing is provided with a tubular spout 15 projecting upwardly and having a bevelled upper edge so that discharge from the container without dripping is ensured.

What I claim is:

1. The combination of a container having a neck with a pouring opening and an annular bead directed outwardly from said neck around said opening; and a closing device for said container comprising a bushing of elastically extensible material including an inner wall lying within said pouring opening of the container neck, an annular top wall extending outwardly from the top of said inner wall, an outer wall joined to the outer periphery of said annular top wall and having an upper part with an inwardly opening annular recess tightly receiving said bead of the container neck and a lower part flaring outwardly away from said container neck, the lower edge portion of said lower part of the outer wall being reverted outwardly and upwardly to define an upwardly opening groove, the free edge of said outer wall being enlarged inwardly to restrict the opening of said groove; and a closing cap pushed onto said bushing and including a circular top wall, and an outer wall depending from the periphery of said circular top wall and tightly engaging at least said upper part of the outer wall of the bushing, said outer wall of the closing cap having an annular, outwardly directed bead along its lower edge which is firmly held in said groove by said inwardly enlarged free edge of the outer wall of said bushing; the upper and lower surfaces of said top walls of the bushing and closing cap, respectively, having cooperating projections and recesses engaged with each other and formed with radially extending flanks which are inclined in the circumferential direction relative to the axis of the container neck so that turning of said cap relative to said bushing forcibly moves the cap upwardly with respect to the bushing for removing said bead of the cap from said groove of the bushing.

2. The combination as in claim 1;
wherein said closing cap has a cylindrical extension extending from said lower surface of the circular top wall and spaced inwardly from said outer wall of the cap, said cylindrical extension engaging closely within said inner wall of the bushing, said cylindrical extension having a radially outward directed shoulder extending over said annular top wall of the bushing and formed with said projections and recesses of the closing cap.

3. The combination as in claim 1;
wherein said lower part of the outer wall of said bushing has an outer surface portion tightly engaged by said outer wall of the cap so as to be held radially inward by the latter for preventing disengagement of said bushing from the container neck.

References Cited in the file of this patent
UNITED STATES PATENTS

| | | |
|---|---|---|
| 2,162,712 | Hamberger | June 20, 1939 |
| 2,625,306 | Murphy | Jan. 13, 1953 |
| 2,690,861 | Tupper | Oct. 5, 1954 |
| 2,975,947 | Pellett | Mar. 21, 1961 |

FOREIGN PATENTS

| | | |
|---|---|---|
| 158,981 | Australia | Sept. 22, 1954 |